June 24, 1947.   W. F. DICKSON   2,422,891
BROOM HOLDER
Filed Sept. 12, 1945

INVENTOR:
WILLIAM F. DICKSON.
BY Fred L. Pherson
ATTORNEY.

Patented June 24, 1947

2,422,891

UNITED STATES PATENT OFFICE 2,422,891

BROOM HOLDER

William F. Dickson, St. Louis, Mo.

Application September 12, 1945, Serial No. 615,881

1 Claim. (Cl. 24—249)

This invention relates to broom holders.

The object of my invention is the provision of a holder that can be secured to a wall, door, or other support, and, that will serve effectively to grip and clamp the handle of a broom, mop, rake, hoe, or other implement so that the implement will be suspended therefrom, but not touch or rest upon the floor, thus broom straws will be prevented from being distorted, mop strands can hang straight to dry out, and implement heads such as rakes, hoes, etc., will be elevated from the floor.

A further object of the invention resides in the provision of a holder that an implement handle can be thrust upwardly through an opening in a hingedly supported member and then firmly and positively gripped and clamped to support the implement in a suspended position with respect to a floor.

A further object of the invention resides in a two piece holder that can be very cheaply manufactured, that will last indefinitely, that will not get out of working order, that will accommodate implement handles of different diameters from the smallest to the largest, and, which will permit an arcuate gripping portion of the handle receiving opening in one of the two pieces to firmly grip and clamp the handle and hold the implement in a suspended position at a desired elevation above a floor.

Other objects of the invention will be obvious and in fact hereinafter pointed out.

My invention accordingly consists in the novel features of construction, combination of elements and arrangement of the parts which will be exemplified in the construction hereinafter described, and of which the scope will be indicated in the claim hereto appended.

In the drawing, in which is shown one of the various possible illustrative embodiments of the invention:

Figure 1:
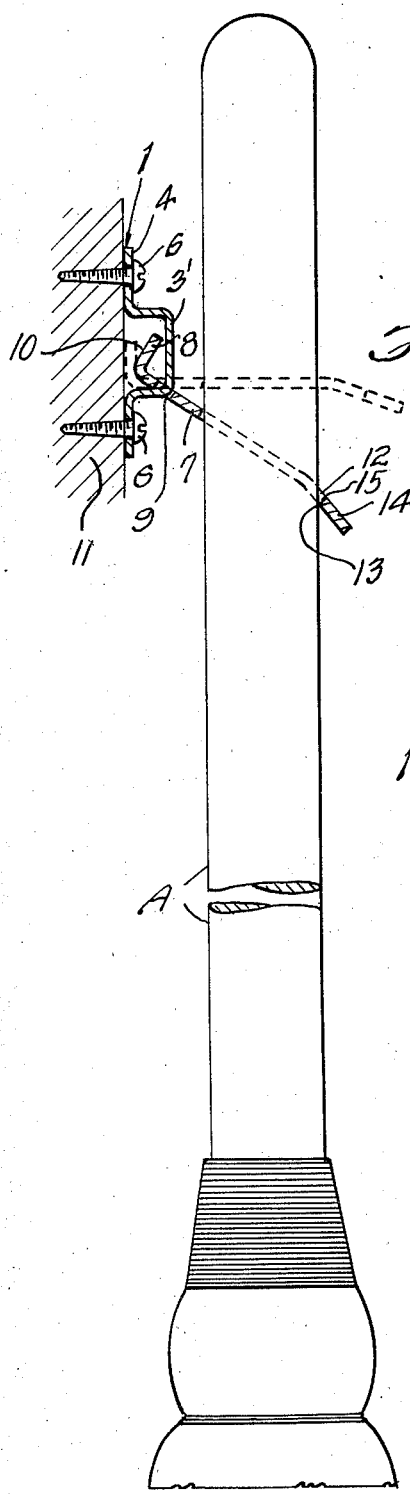
Fig. 1 is a view in sectional elevation of a holder and a broom suspended by the holder.

In carrying out the invention, I employ a bracket designated, generally, as 1, and a handle holding member designated, generally as 2.

The bracket 1 is formed to provide a U-shaped portion 3 terminating at opposite ends in ears 4 provided with openings 5 adapted to receive suitable fastening devices, such, for instance, as screws 6 for securing the bracket to a wall, door, or the like and the front wall 3' of the bracket lies parallel with and spaced from the wall to provide a space therebetween.

Figure 3:
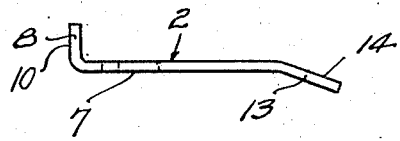
Fig. 3 is a side elevation thereof.

The handle holding member 2 is formed from sheet metal, or other suitable material and consists of a plate 7 having a flange, or lip 8 at one end thereof, which is bent upwardly to stand at a right angle to the plate 7, as clearly shown in detail in Fig. 3 and adapted to function in the space between the wall and the front wall of the U-shaped portion of the bracket 1, as clearly shown in Fig. 1. The plate is provided with an elongated transverse slot 9 which lies adjacent to and parallel with the flange, or lip 8 and it is of a width and length to receive the lower front corner of the U-shaped portion of the bracket 1, providing thereby a hinged connection to permit the plate 7 to swing a limited distance both up and down. When in the limit of its upward swinging movement the plate 7 will assume a horizontal position, and, when in the limit of the downward swinging movement, it will assume an inclined position. When the plate 7 is in its horizontal position, the rear face 10 of the flange 8 engages the wall or support 11 to which the bracket is secured, and when the plate 7 is in its lowermost inclined position, the free edges of the flange, or lip 8 contacts the inner face of the front wall of the U-shaped portion 3 of the bracket 1.

Figure 2:
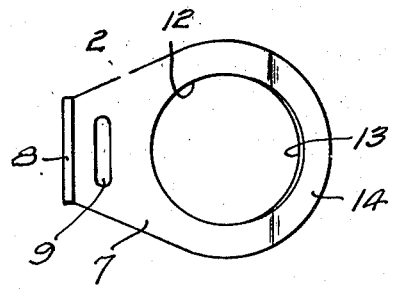
Fig. 2 is a top plan view of the implement handle gripping member.
Figure 4:
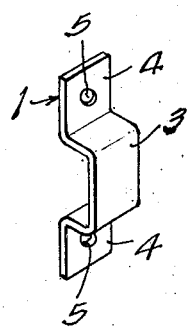
Fig. 4 is a view in perspective of the handle gripping member supporting bracket.
Figure 5:
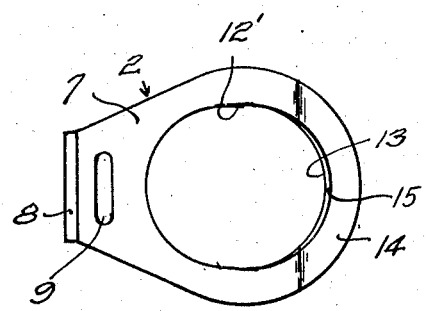
Fig. 5 is a plan view of the handle gripping member showing a modification thereof.

The plate 7 is further provided with an implement handle receiving opening 12 which opening may be either round, as shown in Fig. 2, or it may be slightly elongated as shown by the reference character 12' in Fig. 4 and of a diameter sufficient to receive handles of various diameters. In order to provide a handle gripping edge 13 arcuate in form, the forward portion 14 of the plate 7 is bent downwardly at an obtuse angle to the remainder of the plate material. The line along which the plate material is bent strikes a chord through the handle opening, thus the forward portion of the handle receiving opening is disposed at an angle upwardly and outwardly, as at 15, to provide the handle gripping edge 13 at the lower edge of the wall of the opening 12. The upper forward edge of the opening is arranged to lie slightly below the upper plane of the rearward adjacent portion of the plate 7.

In practice, the handle A of a broom, mop, or other implement, is thrust upwardly through the opening 12 or 12' which slightly raises the forward end of the plate 7, and when the handle has been moved to the desired elevation from the floor, the operator releases his, or her grip on the handle A, which causes the plate 7 to drop by gravity and cause the gripping edge 13 to grip the handle A and clamp the same and to hold the handle in a vertical position the desired elevation above the floor, as clearly shown in Fig. 1.

From the foregoing description, it is clearly apparent that I provide a broom holder that is cheap in the cost of manufacture, consisting of a minimum of parts, and highly efficient for the purpose intended.

The many advantages of the device herein disclosed and illustrated in the drawing will readily suggest themselves to those skilled in the art to which it appertains.

What I claim is:

A holder for hanging brooms, brushes, mops and the like, having a bracket provided with a U-shaped portion terminating at its ends in ears adapted to be secured to a support with the front wall of the U-shaped portion of the bracket lying parallel with and spaced from the wall to provide a space therebetween, a handle holding plate having a handle receiving opening therethrough, said plate having a hinged connection with the U-shaped bracket at the lower front corner thereof, the inner end portion of the plate to the rear of the hinged connection terminating in an upwardly projecting flange arranged to function in the space between the wall and the U-shaped bracket portion to limit both upward and downward arcuate movement of the handle holding plate, and an arcuately shaped handle biting edge arranged at the lower forward edge of the handle receiving opening with the upper forward edge of the handle receiving opening arranged to lie slightly below the upper plane of the rearward adjacent portion of the plate and in a position forward to that of the handle biting edge on the lower edge of the wall of the handle receiving opening.

WILLIAM F. DICKSON.

REFERENCES CITED

The following references are of record in the file of this patent:

UNITED STATES PATENTS

| Number | Name | Date |
|---|---|---|
| 1,404,477 | Pattberg et al. | Jan. 24, 1922 |
| 246,408 | Mills | Aug. 30, 1881 |
| 894,248 | Weller | July 28, 1908 |
| 132,089 | Lewis | Oct. 8, 1872 |
| 1,182,109 | Simmons | May 9, 1916 |
| 1,652,243 | Huboux | Dec. 13, 1927 |